(12) United States Patent
Cornaby et al.

(10) Patent No.: US 7,231,511 B2
(45) Date of Patent: Jun. 12, 2007

(54) MICROINSTRUCTION POINTER STACK INCLUDING SPECULATIVE POINTERS FOR OUT-OF-ORDER EXECUTION

(75) Inventors: Michael P. Cornaby, Hillsboro, OR (US); Ben Chaffin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 10/032,154

(22) Filed: Dec. 20, 2001

(65) Prior Publication Data

US 2003/0191929 A1    Oct. 9, 2003

(51) Int. Cl.
*G06F 9/42* (2006.01)

(52) U.S. Cl. .................. 712/239; 712/207; 712/243; 712/245

(58) Field of Classification Search ............... 711/130, 711/219, 213; 712/218, 243, 239
See application file for complete search history.

(56) References Cited

U.S. PATENT DOCUMENTS

| | | | | |
|---|---|---|---|---|
| 4,488,227 A * | 12/1984 | Miu et al. | .................... | 712/244 |
| 4,491,912 A * | 1/1985 | Kainaga et al. | ............. | 712/243 |
| 4,571,673 A * | 2/1986 | Horst et al. | .................. | 712/243 |
| 4,884,244 A * | 11/1989 | Brewer | ........................ | 365/240 |
| 4,890,221 A * | 12/1989 | Gage | ........................... | 712/228 |
| 5,023,828 A * | 6/1991 | Grundmann et al. | ......... | 712/245 |
| 5,136,696 A * | 8/1992 | Beckwith et al. | ........... | 712/240 |
| 5,459,845 A * | 10/1995 | Nguyen et al. | ............. | 712/248 |
| 5,487,157 A * | 1/1996 | Mizugaki | .................... | 712/244 |
| 2002/0129229 A1* | 9/2002 | Cornaby et al. | ............ | 712/245 |

\* cited by examiner

*Primary Examiner*—Kenneth S. Kim
(74) *Attorney, Agent, or Firm*—Fish & Richardson P.C.

(57) ABSTRACT

Methods and apparatus, including computer program products, for a microinstruction pointer stack in a processor. A method executed in a processor includes executing microcode (μcode) addressed by pointers stored in an out-of-order microinstruction pointer (μIP) stack, and manipulating the μIP stack with a set of microinstructions.

38 Claims, 4 Drawing Sheets

MICROINSTRUCTION POINTER STACK INCLUDING SPECULATIVE POINTERS FOR OUT-OF-ORDER EXECUTION

TECHNICAL FIELD

This invention relates to a microinstruction pointer stack in a processor.

BACKGROUND

A microprocessor is a computer processor on a microchip. The microprocessor is typically designed to perform arithmetic and logic operations that make use of small number-holding areas called registers. Typical microprocessor operations include adding, subtracting, comparing, and fetching operands from memory or registers. These operations result from execution a set of instructions that comprise a program. The set of instructions are part of the microprocessor design.

DETAILED DESCRIPTION

Figure 1:
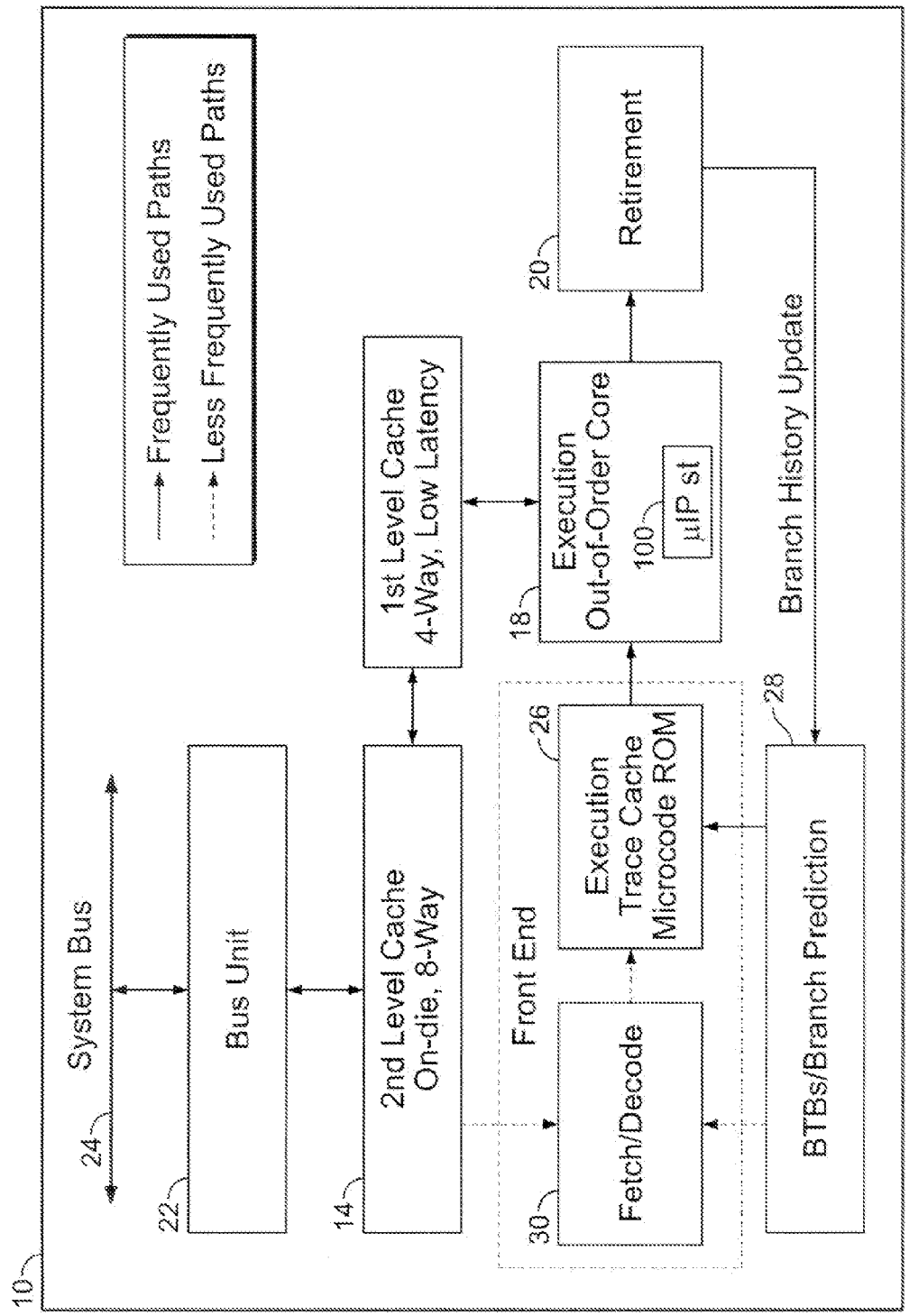
FIG. 1 is a block diagram of a processor.

Referring to FIG. 1 a processor 10 is shown. The processor 10 is a three way super scaler, pipelined architecture. Using parallel processing techniques, the processor 10 decodes, dispatches, and completes execution of (retire) three instructions per clock cycle. To handle this level of instruction throughput, the processor 10 uses a decoupled, e.g., twelve stage pipeline that supports out of order instruction execution. The pipeline of the processor 10 is divided into four sections, i.e., a first level cache 12, a second level cache 14, a front end 16, an out of order execution core 18, and a retire section 20. Instructions and data are supplied to these units through a bus interface unit 22 that interfaces with a system bus 24. The front end 16 supplies instructions in program order to the out of order execution core 18 that has very high execution bandwidth and can execute basic integer operations with one-half clock cycle latency. The front end 16 fetches and decodes instructions into simple operations called micro-ops (µops). The front end 16 can issue multiple µops per cycle, in original program order, to the out of order execution core 18. The front end 16 performs several basic functions. For example, the front end 16 performs prefetch instructions that are likely to be executed. The front end 16 decodes instructions into micro operations and generates micro code for complex instructions, delivers decoded instructions from an execution trace cache 26, and predicts branches using advanced algorithms in a branch prediction unit 28.

The front end 16 of the processor 10 addresses some common problems in high speed, pipelined microprocessors. Two of these problems, for example, contribute to major sources of delays. These problems are the time to decode instructions fetched from the target and time wasted to decode instructions due to branches or branch targets that occur in the middle of cache lines.

The execution trace cache 26 addresses both of these issues by storing decoded instructions. Instructions are fetched and decoded by a translation engine (not shown) and built into sequences of µops called traces. These traces of µops are stored in the trace cache 26. The instructions from the most likely target of a branch immediately follow the branch, without regard for continuity of instruction addresses. Once a trace is built, the trace cache 26 is searched for the instruction that follows that trace. If that instruction appears as the first instruction in an existing trace, the fetch and decode of instructions 30 from the memory hierarchy ceases and the trace cache 26 becomes the new source of instructions.

The execution trace cache 18 and the translation engine (not shown) have cooperating branch prediction hardware. Branch targets are predicted based on their linear addresses using Branch Target Buffers (BTBS) 28 and fetched as soon as possible. The branch targets are fetched from the trace cache 26 if they are indeed cached there; otherwise, they are fetched from the memory hierarchy. The translation engine's branch prediction information is used to form traces along the most likely paths.

The core 18 executes instructions out of order enabling the processor 10 to reorder instructions so that if one µop is delayed while waiting for data or a contended execution resource, other µops that are later in a program order may execute before the delayed µops. The processor 10 employs several buffers to smooth the flow of µops. This implies that when one portion of the pipeline experiences a delay, that delay may be covered by other operations executing in parallel or by the execution of pops which were previously queued up in one of the buffers.

The core 18 is designed to facilitate parallel execution. The core 18 can dispatch up to six µops per cycle; note that this exceeds the trace cache 26 and retirement 20 µop bandwidth. Most pipelines can start executing a new µop every cycle, so that several instructions can be processed any time for each pipeline. A number of arithmetic logical unit (ALU) instructions can start two per cycle, and many floating point instructions can start one every two cycles. Finally, pops can begin execution, out of order, as soon as their data inputs are ready and resources are available.

The out of order execution core 18 includes an out of order microinstruction pointer (IP) stack 100. In general, a stack is a data area or buffer used for storing requests that need to be handled. A stack is typically a push-down list, meaning that as new requests come into the stack, the stack pushes down older requests. Another way of looking at a push-down list—or stack—is that a program usually takes its next item to handle from the top of the stack, unlike other arrangements such as "FIFO" or "first-in first-out" buffers. The stack 100 is implemented in a microcode environment. This allows fast subroutine returns in microcode. It also allows fast assist returns in microcode.

The µIP stack 100 is different from a macroinstruction stack in several ways. For example, the µIP stack 100 is not visible from a system level (i.e., the µIP stack 100 cannot be directly manipulated from macrocode). The µIP stack 100 is an out-of-order stack where values are placed on the stack and removed from the stack before it is known if the sequence of operations were valid. Thus, a set of recovery mechanisms is required to correct a sequence of operations that are later determined to be incorrect. The process of manipulating the stack (PUSH, POP, etc.) is very different from a traditional macroinstruction stack because of the out-of-order nature of the stack 100.

The μIP stack 100 provides a mechanism for improving the performance of microcode (μcode) execution. Microcode is programming that is ordinarily not program-addressable but, unlike hardwired logic, is capable of being modified. Microcode may sometimes be installed or modified by a device's user by altering programmable read-only memory (PROM) or erasable programmable read-only memory (EPROM).

The μIP stack 100 provides a lower-overhead ability to jump to various subroutines and use "assists" to efficiently accomplish μcode functions. The μIP stack 100 has significant performance and μcode efficiency implications that permeate numerous instructions. For example, use of the μIP stack 100 improves performance by removing indirect μcode jumps and allows μcode to share routines more easily by removing subroutine penalties. By removing subroutine penalties, the μIP stack 100 allows μcode to share routines more easily.

The retirement section 20 receives the results of the executed μops from the execution core 18 and processes the results so that the proper architectural state is updated according to the original program order. For semantically correct execution, the results of instructions are committed in original program order before the instructions are retired. Exceptions may be raised as instructions are retired. Thus, exceptions do not occur speculatively, but rather exceptions occur in the correct order, and the processor 10 can be correctly restarted after execution.

When a μop completes and writes its result to the destination, it is retired. Up to three μops may be retired per cycle. A ReOrder Buffer (ROB) (not shown) in the retirement section 20 is the unit in the processor 10 which buffers completed μops, updates the architectural state in order, and manages the ordering of exceptions.

The retirement section 20 also keeps track of branches and sends updated branch target information to the BTB 28 to update branch history. In this manner, traces that are no longer needed can be purged from the trace cache 26 and new branch paths can be fetched, based on updated branch history information.

Figure 2:
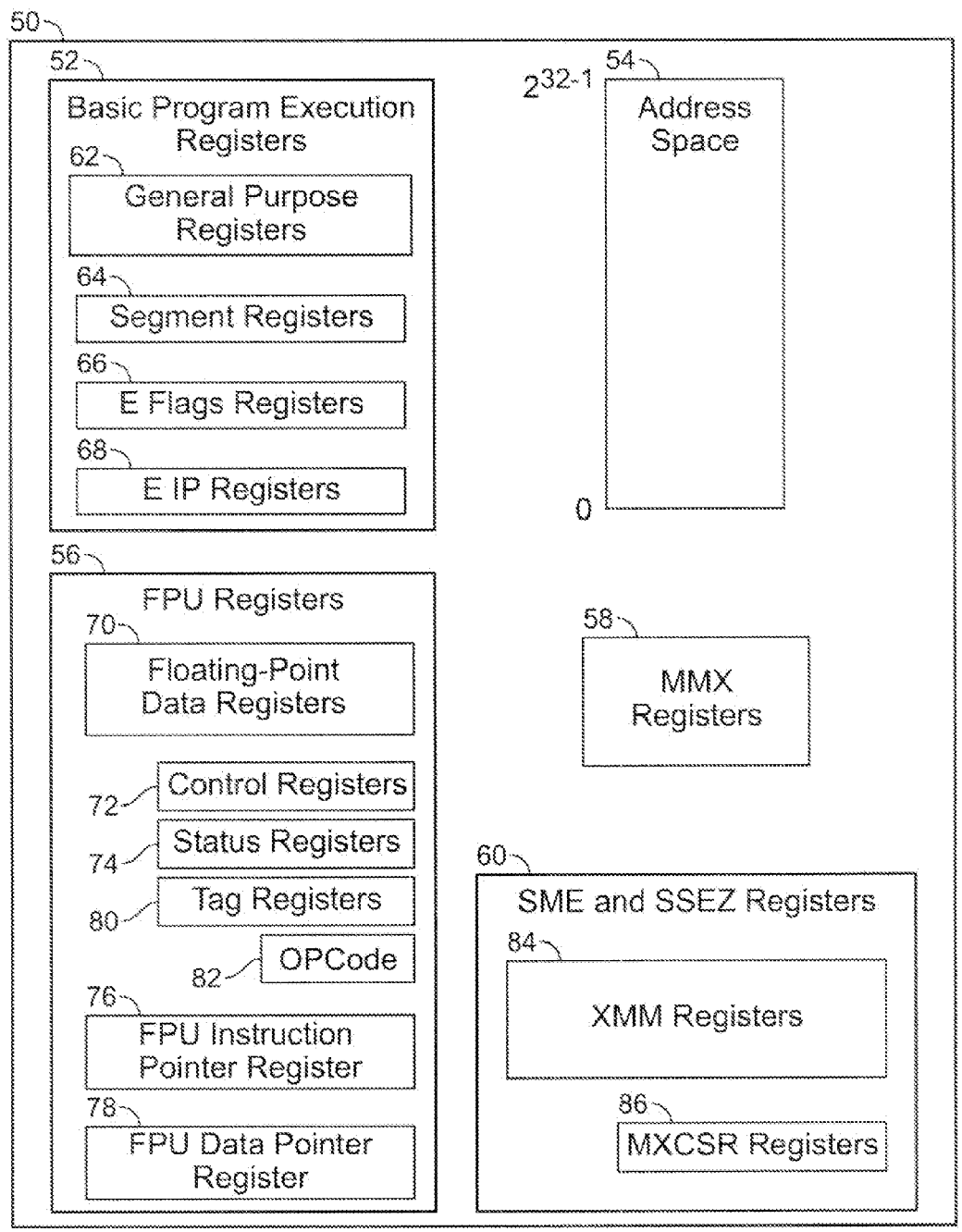
FIG. 2 is a block diagram of an executive environment of the processor of FIG. 1.

Referring to FIG. 2, an execution environment 50 is shown. Any program or task running on the processor 10 (of FIG. 1) is given a set of resources for executing instructions and for storing code, data, and state information. These resources make up the execution environment 50 for the processor 10. Application programs and the operating system or executive running on the processor 10 use the execution environment 50 jointly. The execution environment 50 includes basic program execution registers 52, an address space 54, Floating Point Unit (FPU) registers 56, multimedia extension registers (MMX) 58, and SIMD extension registers 60.

Any task or program running on the processor 10 can address a linear address base 54 of up to four gigabytes ($2^{32}$ bytes) and a physical address space of up to 64 gigabytes ($2^{36}$ bytes). The address space 54 can be flat or segmented. Using a physical address extension mechanism, a physical address space of $2^{36-1}$ can be addressed.

The basic program execution registers 52 include eight general purpose registers 62, six segment registers 64, an EFLAGS register 66, and an EIP (instruction pointer) register 68. The basic program execution registers 52 provide a basic execution environment in which to execute a set of general purpose instructions. These instructions perform basic integer arithmetic on byte, word, and doubleword integers, handle program flow control, operate on bit and byte strengths, and address memory.

The FPU registers 56 include eight FPU data registers 70, an FPU control register 72, a status register 74, an FPU instruction pointer register 76, an FPU operand (data) pointer register 78, an FPU tag register 80 and an FPU op code register 82. The FPU registers 56 provide an execution environment for operating on single precision, double precision, and double extended precision floating point values, word-, doubleword, and quadword integers, and binary coded decimal (BCD) values.

The eight multimedia extension registers 58 support execution of single instruction, multiple data (SIMD) operations on 64-bit packed byte, word, and doubleword integers.

The SIMD extension registers 60 include eight extended multimedia (XMM) data registers 84 and an MXCSR register 86. The SIMD extension registers 60 support execution of SIMD operations on 128-bit packed single precision and double precision floating point values and on 128-bit packed byte, word, doubleword and quadword integers.

A stack (not shown) supports procedure or subroutine calls and the passing of parameters between procedures or subroutines.

The general purpose registers 62 are available for storing operands and pointers. The segment registers 64 hold up to six segment selectors. The EFLAGS (program status and control) registers 66 report on the status of a program being executed and allows limited (application program level) control of the processor. The EIP (instruction pointer) register 68 has a 32-bit pointer to the next instruction to be executed.

The 32-bit general purpose registers 62 are provided for holding operands for logical and arithmetic operations, operands for address calculations, and memory pointers. The segment registers 64 hold 16-bit segment selectors. A segment selector is a special pointer that identifies a segment in memory. To access a particular segment in memory, the segment selector for that segment must be present in the appropriate segment register 64.

When writing application code, programmers generally produce segment selectors with assembler directives and symbols. The assembler and other tools generate the actual segment selector values associated with these directives and symbols. If writing system code, programmers may need to generate segment selectors directly.

How segment registers 64 are used depends on the type of memory management model that the operating system or executive is using. When using a flat (unsegmented) memory model, the segment registers 64 are loaded with segment selectors that point to overlapping segments, each of which begins at address zero on the linear address space. These overlapping segments also include the linear address space for the program. Typically, two overlapping segments are defined: one for code and another for data and stacks. The CS segment register (not shown) of the segment registers 64 points to the code segment and all other segment registers point to the data and stack segment.

When using a segmented memory model, each segment register 64 is ordinarily loaded with a different segment selector so that each segment register 64 points to a different segment within the linear address space. At any time, a program can thus access up to six segments in the linear address space. To access a segment not pointed to by one of the segment registers 64, a program first loads the segment selector to be accessed into a segment register 64.

The 32-bit EFLAGS register 66 has a group of status flags, a control flag, and a group of system flags. Some of the flags in the EFLAGS register 66 can be modified directly, using special purpose instructions. The following instructions can be used to move groups of flags to and from the procedure stacks or general purpose register: LAHF, SAHF, push-F, push-FD, pop-F, and pop-FD. After the contents of EFLAGS register 66 have been transferred to the procedure stack or a general purpose register, the flags can be examined and modified using the processor 10 bit manipulation instructions.

When suspending a task, the processor 10 automatically saves the state of the EFLAGS register 66 in the task state segment (TSS) (not shown) for the task being suspended. When binding itself to a new task, the processor 10 loads the EFLAGS register 66 with data from the new tasks program state register (PSS, not shown).

When a call is made to an interrupt or an exception handler procedure the processor 10 automatically saves the state of the EFLAGS register 66 on the procedure stack. When an interrupt or exception is handled with a task switch, the state of the EFLAGS register 66 is saved on the TSS for the task being suspended.

The fundamental data types used in the processor 10 are bytes, words, doublewords, quadwords and double quadwords. A byte is eight bits, a word is two bytes (16-bits), a doubleword is four bytes (32-bits), a quad word is eight bytes (64-bits), and a double quadword is sixteen bytes (128-bits).

Figure 3:
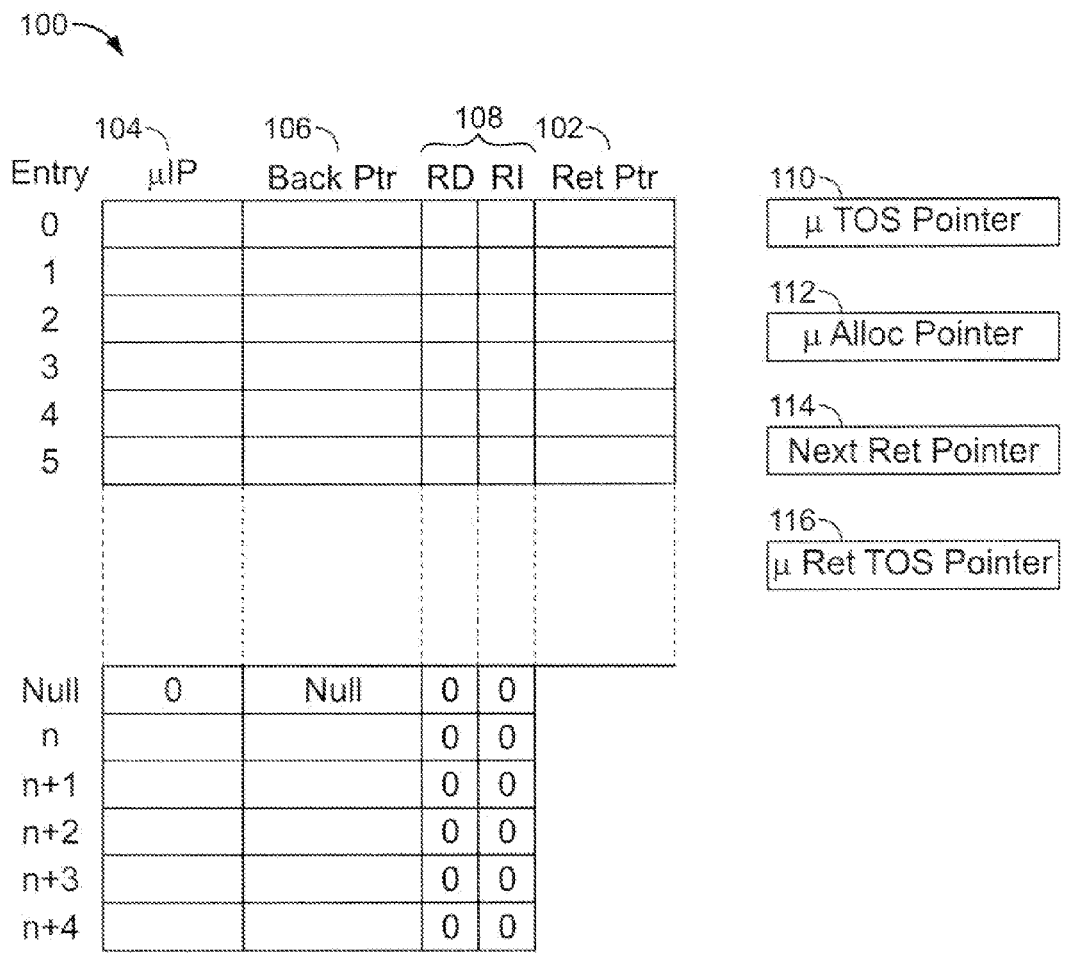
FIG. 3 is a diagram of an out of order microinstruction pointer stack implemented in the out of order execution core of FIG. 1.

Referring to FIG. 3, the first n entries of the µIP stack 100 are the in flight part of the µIP stack 100. In flight entries refer to entries currently being processed. The other entries are the retired part of the µIP stack. Retired entries are those that are no longer being processed.

A µIP field 104 has the µIP pushed by a ms_push µOp (described below) and used by a fast_return µOp (described below) and has a width of 14 bits.

A BackPtr field 106 points to a next entry in the µIP stack for µTOS to point to after an ms_return/ms_pop µop. It has room for the pointer value and a wrap bit so its width depends on stack size.

When an in flight entry retires, the RetPtr field 102 is updated to point to the location in the retired stack (not shown) to which the entry is copied. Thus, its width depends on the stack size.

A RO/RI field 108 records whether this in flight entry has retired. Two bits are needed to handle wrap cases and thus its width is 2 bits.

The µIP stack 100 includes four pointers that point to different entries in the µIP stack 100. The four pointers are a µTOS pointer 110, an µAlloc pointer 112, a NextRet pointer 114, and a µRetTOS pointer 116. The µTOS pointer 110, µAlloc pointer 112, and NextRet pointer 114 require a wrap bit.

The µTOS pointer 110 is the current top of stack 100 for µOp issue and points to one of the entries in the table or to a NULL entry. The µTOS pointer 110 is set to the current µAlloc pointer 112 on the issue of a ms_push µOp (described below). Note that it can point to any entry in the table (both in the in flight section and the retired section).

The uAlloc pointer 112 points at the next entry to be allocated when an ms_push µOp (described below) is issued. The last entry this pointer can point to is n−1. After this point it wraps, so the entries from 0 to n−1 are treated as a circular queue.

The NextRet pointer 114 points at the next entry to be deallocated from the µIP stack 100 when a µIP stack operation retires. Like the µAlloc pointer 112, this pointer wraps at n−1.

The µRetTOS pointer 116 points at the retired top of stack 100. This pointer can never point to entries 0 to n−1.

Additional µOps are used with the µIP stack 100. The additional µOPs are: ms_call, ms_push, ms_pop, ms_return, ms_tos_read, and ms_µip_stack_clear. Alternatively, call, return, and clear could be attached to other µops.

The ms_call µOP takes the next pip, pushes it on the µIP stack 100, and uses the pip in the immediate field as the target pip of a jump.

The ms_push µOP takes the value in the immediate field and pushes it on the µIP stack 100.

The ms_pop µOP pops a value off the µIP stack 100 and replaces this µOp's immediate field.

The ms_return µOP pops a value off the µIP stack 100 and jumps to that pip.

The ms_tos_read µOP reads a value off the µIP stack 100 and replaces this µOp's immediate field, without changing the contents of the µIP stack 100.

The ms_µip_stack_clear µOP sets the µIP stack pointers to the reset values. Note that this µOp is executed at a time when all preceding stack operations and retirements are complete.

Figure 4:
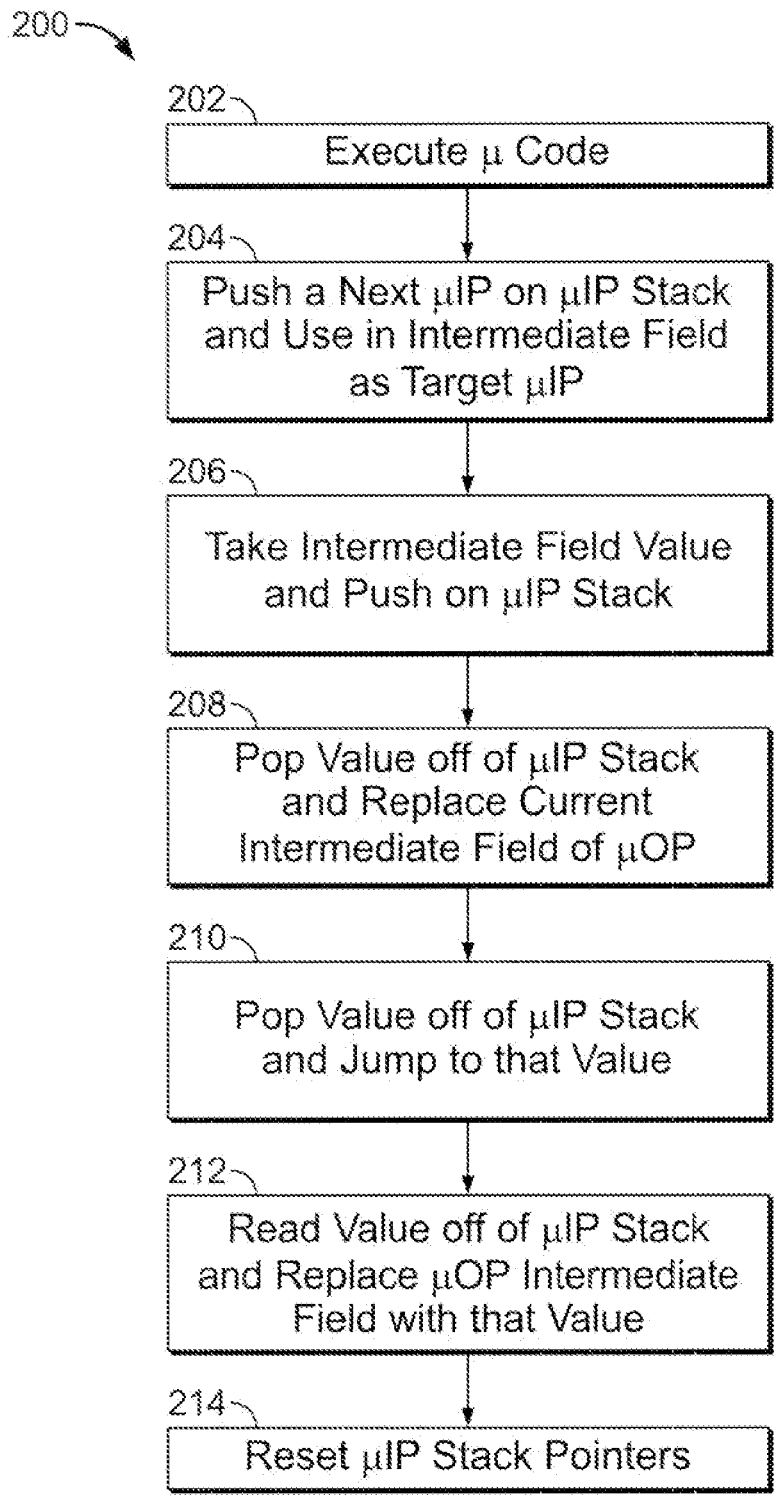
FIG. 4 is a flow diagram of a µIP stack process.

Referring to FIG. 4, a micro-instruction pointer (µIP) stack process 200 includes executing (202) microcode (µcode) stored in a out-of-order µIP stack. The process 200 pushes (204) a next µIP on to the µIP stack and uses the next µIP in an intermediate field as a target µIP in a jump operation. The process 200 takes (206) a value of an intermediate field of a microoperation (µOp) and pushes the value on to the µIP stack.

The process 200 pops (208) a value off the µIP stack and replaces a current µOp intermediate field with the value. The process 200 pops (210) a value off of the µIP stack and jumps to that value.

The process 200 reads (212) a value off the µIP stack and replaces a µOp's intermediate field with the value. The process 200 sets (214) the µIP stack pointers to reset.

The following terminology is used throughout the description below. MAX_INFLIGHT refers to the maximum number of calls allowed to be alive in the processor at once. MAX_STACK refers to the deepest function nesting level allowed. RET_OFFSET refers to offset in the table 100 of the first entry in the retired area. NULL_INDEX refers to the index in the table 100 of the null entry. The code below assumes that this lies between the in flight section and the retired section of the stack 100.

```
At reset:
        µTOS.ptr = NULL_INDEX
        µTOS.wrap = 0
        µAlloc.ptr = 0
        µAlloc.wrap = 0
        NextRet.ptr = 0
        NextRet.wrap = 0
        µRetTOS = NULL_INDEX
On issue of ms_call pOp:
        if (µAlloc.ptr == NextRet.ptr && pAlloc.wrap !=
        NextRet.wrap) MSStall;
        stack[µAlloc.ptr].BackPtr = µTOS;
        stack[µAlloc.ptr].µip = current_µip + 1;
        stack[µAlloc.ptr].R[µAlloc.wrap1 = 0;
        µTOS = pAlloc; //copies both the pointer and the wrap
        bit
        µAlloc.ptr = (µAlloc.ptr + 1)%MAX_INFLIGHT;
        if (µAlloc.ptr ==0)
                µAlloc.wrap ^=1;
        next_µip = ms_call µip (immediate field)
``` where, if the µAlloc pointer is equal to the NextRet pointer and their wrap bits are different, then the in flight table is full and one cannot issue any more call/push µops until one retires. If the table is not full, then µAlloc.ptr points to the next entry to be allocated, so it is updated. More specifically, the current value of µTOS is placed into the BackPtr so we know where to return to. The µIP of the pop after the call/push is put into the µip field. One of the R (retired) bits cleared (which R bit one depends on the current wrap bit of µAlloc). The µTOS is set to point to the current entry (µAlloc). Both the pointer and the wrap bit must be copied. µAlloc is incremented, wrapping (and toggling the wrap bit) if necessary. Finally, branch to the µIP in the immediate field of the pop.

On issue of ms_push µOp instruction, the same events as in a ms_call µOP occur, except that the µop's immediate field is copied into the µip field of the stack instead of the µIP of the next µop, and the next µIP to be sequenced is determined as usual.

On issue of ms_return µOp instruction:
next_µip=stack[µTOS.ptr].µip;
back_ptr=stack[µTOS.ptr].BackPtr;
if (stack[back_ptr. ptr].R[back_ptr.wrap] ==1)
 µTOS.ptr=stack[back_ptr.ptr].RetPtr; //wrap bit doesn't matter
else
 µTOS=back_ptr; //copies both pointer and wrap bit where it gets the next µIP to sequence from the pip field of the stack entry pointed to by µTOS. Then pop the stack: the BackPtr of the entry pointed to by µTOS has the index of the entry underneath this one on the stack. However, if that entry has retired since the BackPtr was set, it may have been overwritten by another speculatively issued call. So check the R bit of the entry pointed to by BackPtr. If it is 0, then the BackPtr entry is valid and we set µTOS to point to it; if the R bit is 1, then the RetPtr field of that entry has its forwarding address.

On issue of the ms_pop µOP instruction the same events occur as the ms_return µinstruction, except the immediate field of the ms_pop µop is replaced with the µip field from the stack entry pointed to by µTOS, and the next µIP is determined normally.

---

On retirement of ms_call or ms_push µOp instruction:
 old_µRetTOS = µRetTOS;
 µRetTOS++; //no wrap needed --better not overflow!
 stack [µRetTOS].BackPtr.ptr = old_µRetTOS; //wrap bit doesn]t matter
 stack [µRetTOS].µip = stack[NextRet.ptr].µip;
 stack [NextRet.ptr].RetPtr = µRetTOS;
 stack[NextRet. ptrl].R[NextRet.wrap]=1;
 if (NextRet.ptr == µTOS.ptr) //wrap bits always the same
  µTOS.ptr = µRetTOS; //wrap bit doesn't matter
 NextRet.ptr = (NextRet.ptr + 1)%MAX_INFLIGHT;
 if (NextRet.ptr == 0)
  NextRet. wrap =1;
 clear any MSStall due to full in-flight stack;

--- where the µRetTos is incremented, µRetTOS, making sure it moves between NULL and the first entry correctly. The old value of the µRetTOS is put in the BackPtr of the new retired entry. The µIP from the entry pointed to by NextRet (the next entry to retire) is copied to the µIP field of the new retired entry. The RetPtr of the entry pointed to by NextRet is set to the new µRetTOS. The R bit of the entry pointed to by NextRet is set to 1. If the NextRet pointer equals the µTOS pointer, then we have just invalidated the entry pointed to by µTOS, so set µTOS to point to the retired copy (the new value of µRetTOS). Increment NextRet, wrapping and toggling the wrap bit if necessary. Clear the MS stall condition resulting from too many push/call operations in flight.

On retirement of ms_return or ms_pop µOp instruction:
µRetTOS--;
—OR— µRetTOS=stack[µRetTOS].BackPtr;

where the µRetTOS pointer is decremented, or replaced with the BackPtr from the entry it points to; these are equivalent. The BackPtr is implemented for the retired stack since it is used in the manipulation of µTOS (unless the rule is: if µTOS is within the retired stack, decrement; otherwise follow the BackPtr).

---

On mispredicted macrobranch/microbranch:
 µAlloc = mispred_µAlloc; //copies both pointer and wrap bit if
 (stack[mispred_µTOS.ptr .R[mispred_pTOS.wrap])
  µTOS.ptr = stack[mispred_µTOS.ptr].RetPtr; //wrap bit doesn't matter
 else
  µTOS = mispred_µTOS; //copies both pointer and wrap bit

--- where the µAlloc and µTOS pointers are restored to the values that were saved when the branch which is mispredicting was issued. However, if the entry which the branch's µTOS points to has retired, set µTOS to point t o its new location in the retired stack instead.

On trap or fault:
µTOS.ptr=NULL_INDEX
µTOS.wrap=0
µAlloc.ptr=0
µAlloc.wrap=0
NextRet.ptr=0
NextRet.wrap=0
µRetTOS=NULL_INDEX On assist:
µRetTOS++;
stack[µRetTOS].µip=assist µip
stack[µRetTOS].BackPtr=µRetTOS-1;
µTOS=µRetTOS
µAlloc.ptr=0
µAlloc.wrap=0
NextRet.ptr=0
NextRet.wrap=0

In the case of a trap, the µIP stack 100 can be completely cleared. By definition of trap, all the previous flows are complete, and all the new flows are speculative, so all values on the µIP stack are speculative and can be thrown away.

There are two cases for a fault. If the fault will not return to the current flow of execution, the µIP stack 100 can be completely cleared. If the fault will return to the flow of execution, either the µIP stack 100 needs to be recovered or it needs to be cleared and a restriction placed on flows which can do this as to their use of ms_push/fast_return.

The following example illustrates operation of the µIP stack 100. Consider, for example, the following sequence of events occurring in the µIP stack 100:

(A) issue ms_call #1 from µip X
(B) issue ms_call #2 from µip Y
(C) issue µ_jump_cc #1 which will mispredict
(D) issue ms_ret from call #2
(E) issue µ_jump_cc #2 which will mispredict
(F) retire call #1
(G) µ_jump_cc #2 executes and mispredicts
(H) µ_jump_cc #1 executes and mispredicts
(I) retire call #2

Below is the μIP stack 100 as it will appear after each of these operations, assuming MAX_INFLIGHT=3 and MAX_STACK=4. The pointers are indicated on the right; the number to the right of the pointer is the wrap bit.

Start:

| Entry | μIP | BackPtr | R0 | R1 | RetPtr | | |
|---|---|---|---|---|---|---|---|
| 0 | | | | | | <μAlloc-0 | <NextRet-0 |
| 1 | | | | | | | |
| 2 | | | | | | | |
| NULL | 0 | NULL | 0 | 0 | | <μRetTOS | <μTOS |
| 4 | | | 0 | 0 | | | |
| 5 | | | 0 | 0 | | | |
| 6 | | | 0 | 0 | | | |
| 7 | | | 0 | 0 | | | |

After (A): Push X+1 onto the μIP stack 100, update μAlloc and μTOS pointers.

| Entry | μIP | BackPtr | R0 | R1 | RetPtr | | |
|---|---|---|---|---|---|---|---|
| 0 | X+1 | NULL | 0 | | | <Next Ret-0 | <μTOS-0 |
| 1 | | | | | | <μAlloc-0 | |
| 2 | | | | | | | |
| NULL | 0 | NULL | 0 | 0 | | <μRetTOS | |
| 4 | | | 0 | 0 | | | |
| 5 | | | 0 | 0 | | | |
| 6 | | | 0 | 0 | | | |
| 7 | | | 0 | 0 | | | |

After (B): Push Y+1 on the μIP stack 100, update μAlloc and μTOS pointers.

| Entry | μIP | BackPtr | R0 | R1 | RetPtr | |
|---|---|---|---|---|---|---|
| 0 | X+1 | NULL | 0 | | | <Next Ret-0 |
| 1 | Y+1 | 0-0 | 0 | | | <μTOS-0 |
| 2 | | | | | | <μAlloc-0 |
| NULL | 0 | NULL | 0 | 0 | | <μRetTOS |
| 4 | | | 0 | 0 | | |
| 5 | | | 0 | 0 | | |
| 6 | | | 0 | 0 | | |
| 7 | | | 0 | 0 | | |

After (C): μ_jump_cc #1 issues, taking the values of μAlloc=2-0 and μTOS=1-0 with it.

After (D): Next μIP is Y+1 (μip field of μTOS entry). Take BackPtr of μTOS entry (0-0): look up stack[BackPtr.ptr].R [Backptr.wrap]: stack[0].R0 indicates this entry has not retired and is still valid, so the μTOS pointer gets 0-0.

| Entry | μIP | BackPtr | R0 | R1 | RetPtr | | |
|---|---|---|---|---|---|---|---|
| 0 | X+1 | NULL | 0 | | | <Next Ret-0 | <μTOS-0 |
| 1 | Y+1 | 0-0 | 0 | | | | |
| 2 | | | | | | <μAlloc-0 | |
| NULL | 0 | NULL | 0 | 0 | | <μRetTOS | |
| 4 | | | 0 | 0 | | | |
| 5 | | | 0 | 0 | | | |
| 6 | | | 0 | 0 | | | |
| 7 | | | 0 | 0 | | | |

After (E): μ_jump_cc_2 issues, taking the values of μAlloc=2-0 and μTOS=0-0 with it.

After (F): Increment μRetTOS and copy NextRet entry to new μRetTOS entry. Set the RetPtr of the NextRet entry to point to its new location, and set the R bit. Increment NextRet.

| Entry | μIP | BackPtr | R0 | R1 | RetPtr | |
|---|---|---|---|---|---|---|
| 0 | X+1 | NULL | 0 | | | <μTOS-0 |
| 1 | Y+1 | 0-0 | 0 | | | <NextRet-0 |
| 2 | | | | | | <μAlloc-0 |
| NULL | 0 | NULL | 0 | 0 | | |
| 4 | X+1 | NULL | 0 | 0 | | <μRetTOS |
| 5 | | | 0 | 0 | | |
| 6 | | | 0 | 0 | | |
| 7 | | | 0 | 0 | | |

After (G): μ_jump_cc #2 mispredicts, returning μAlloc=2-0 and μTOS=0-0. Set μAlloc to 2-0, no change. Check R bit of μTOS being restored—it is set, so set μTOS to the RetPtr of that entry instead.

| Entry | μIP | BackPtr | R0 | R1 | RetPtr | | |
|---|---|---|---|---|---|---|---|
| 0 | X+1 | NULL | 1 | | 4 | | |
| 1 | Y+1 | 0-0 | 0 | | | <Next Ret-0 | |
| 2 | | | | | | <μAlloc-0 | |
| NULL | 0 | NULL | 0 | 0 | | | |
| 4 | X+1 | NULL | 0 | 0 | | <μRetTOS | <μTOS-0 |
| 5 | | | 0 | 0 | | | |
| 6 | | | 0 | 0 | | | |
| 7 | | | 0 | 0 | | | |

After (H): μ_jump_cc #1 mispredicts, returning μAlloc=2-0 and μTOS=1-0. Set μAlloc to 2-0, no change.

Check R bit of μTOS we're restoring——it is not set, so set μTOS to the value returned by the mispredict.

| Entry | μIP | BackPtr | R0 | R1 | RetPtr | | |
|---|---|---|---|---|---|---|---|
| 0 | X + 1 | NULL | 1 | | 4 | | |
| 1 | Y + 1 | 0-0 | 0 | | | <Next Ret-0 | μTOS-0 |
| 2 | | | | | | <μAlloc-0 | |
| NULL | 0 | NULL | 0 | 0 | | | |
| 4 | X + 1 | NULL | 0 | 0 | | <μRetTOS | |
| 5 | | | 0 | 0 | | | |
| 6 | | | 0 | 0 | | | |
| 7 | | | 0 | 0 | | | |

After (I): increment μRetTOS and copy NextRet entry to new μRetTOS entry. Set the RetPtr of the NextRet entry to point to its new location, and set the R bit. Since NextRet=μTOS, we have just retired the last valid entry on the μIP stack 100, so set μTOS to point to the new location of the current entry on the retired stack. Increment NextRet.

| Entry | μIP | BackPtr | R0 | R1 | RetPtr | | |
|---|---|---|---|---|---|---|---|
| 0 | X + 1 | NULL | 1 | | 4 | | |
| 1 | Y + 1 | 0-0 | 0 | | 5 | <Next Ret-0 | |
| 2 | | | | | | <μAlloc-0 | <NextRet-0 |
| NULL | 0 | NULL | 0 | 0 | | | |
| 4 | X + 1 | NULL | 0 | 0 | | | |
| 5 | Y + 1 | 4 | 0 | 0 | | <μRetTOS | <μTOS-0 |
| 6 | | | 0 | 0 | | | |
| 7 | | | 0 | 0 | | | |

Several considerations can be made for debugging and design verification. For example, for patching considerations, the μRetTOS pointer can be readable and writeable through microcode. In addition, the retired instruction can be writeable through control register access. This allows microcode to clear the instruction from in flight stack. The microcode can thus read the μRetTOS to determine the number of entries on the retired stack and pop the entries off the stack 100. Popping entries off the stack 100 takes the entries to the EXECUTIVE where the entries can be examined. The microcode can restore the μRetTOS (which puts the stack back to the state it was before the pops), and modify the values in the μRetTOS via control register writes.

The stack pointers μTOS, μAlloc, and NextRet should be visible for debugging. One way to make the stack pointers viable is to allow access through a control register.

Access to the in flight μIP stack 100 can be through a control register mechanism, but an array dump mechanism is acceptable.

Having control register access to the in flight μIP stack 100 hardware may increase microcode flexibility at the risk of being extremely hard to maintain correctness.

A number of embodiments of the invention have been described. Nevertheless, it will be understood that various modifications may be made without departing from the spirit and scope of the invention. For example, an option is to provide a path from the TBPμ to the MS where the EV_μIP can be accessed. This would allow the assisting μOp's μip stack 100 to be pushed on the μIP stack 100 and allow faster returns from assists. Alternately, another μOp could be used to get the pip from the EXEC to the MS for pushing on the MS stack. For longer assist flows, this could eliminate the indirect branch latency.

Accordingly, other embodiments are within the scope of the following claims.

What is claimed is:

1. A superscalar, pipeline processor, the processor comprising:
an out-of-order microinstruction pointer (μIP) stack for storing pointers in a microcode (μcode) execution core, a plurality of the pointers associated with a common instruction that is decoded into a plurality of micro ops, the plurality of pointers placed on the out-of-order microinstruction pointer stack and removed from the microinstruction pointer stack before it is known if a sequence of microinstructions pointed to by the plurality of pointers is valid.

2. The processor of claim 1 in which the μIP stack comprises:
an entry number field;
a microinstruction pointer (μIP) field;
a back pointer field;
a retirement indicator field; and
a return pointer field.

3. The processor of claim 2 in which the μIP field is 14-bits wide.

4. The processor of claim 3 in which the μIP field has a microinstruction pointer (μIP) pushed by a first microoperation (μOp) code of the plurality of micro ops and used by a second μOp code of the plurality of micro ops.

5. The processor of claim 2 in which the back pointer field has a pointer to a next entry in the μIP stack for a micro-type of service (μTOS) bit to point to after a μOp.

6. The processor of claim 2 in which the retirement indicator field has an indication of whether an entry has retired.

7. The processor of claim 2 in the return pointer field a pointer to a location in a retirement stack to which an entry is copied after being retired.

8. A method executed in a superscalar, pipelined processor, the method comprising:
executing microcode (μcode) addressed by pointers stored in an out-of-order microinstruction pointer (μIP) stack, a plurality of pointers associated with a common instruction that is decoded into a plurality of micro ops, the plurality of pointers placed on the out-of-order microinstruction pointer stack and removed from the microinstruction pointer stack before it is known if a sequence of microinstructions pointed to by the plurality of pointers is valid; and
manipulating the μIP stack with a set of microinstructions.

9. The method of claim 8 in which entries in the stack have an entry number field, a microinstruction pointer (μIP) field, a back pointer field, a retirement indicator field and a return pointer field.

10. The method of claim 9 in which the μIP pointer field is 14-bits wide.

11. The method of claim 10 in which the μIP pointer field has a microinstruction pointer (μIP) pushed by a first microoperation (μOp) code of the plurality of micro ops and used by a second μOp code of the plurality of micro ops.

12. The method of claim 9 in which the back pointer field has a pointer to a next entry in the μIP stack for a micro-type of service (μTOS) bit to point to after a μOp.

13. The method of claim 9 in which the retirement indicator field has an indication of whether an entry has retired.

14. The method of claim 9 in which the return pointer field contains a pointer to a location in a retirement stack to which an entry is copied after being retired.

15. The method of claim 9 in which manipulating comprises:
pushing a next μIP on to the μIP stack; and
using the next μIP in an intermediate field as a target μIP in a jump operation.

16. The method of claim 9 in which manipulating comprises:
taking a value of an intermediate field of a microoperation (μOp) of the plurality of micro ops; and
pushing the value on to the μIP stack.

17. The method of claim 9 in which manipulating comprises:
popping a value off the μIP stack; and
replacing a current μOp intermediate field.

18. The method of claim 9 in which manipulating comprises:
popping a value off of the μIP stack; and
jumping to that value.

19. The method of claim 9 in which manipulating comprises:
reading a value off the μIP stack; and
replacing a μOp's intermediate field with the value.

20. The method of claim 9 in which manipulating comprises setting the μIP stack pointers to reset.

21. The method of claim 9 further comprising providing a set of pointers that point to different entries in the μIP stack.

22. The method of claim 21 in which the set of pointers includes a μTOS pointer that points to a top of the μIP stack.

23. The method of claim 21 in which the set of pointers includes a μAlloc pointer that points to a next allocated entry in the μIP stack.

24. The method of claim 21 in which the set of pointers includes a NextRet pointer that points to a next entry in the μIP stack to be deallocated.

25. The method of claim 21 in which the set of pointers includes μRetTos pointer that points at a retired top of the μIP stack.

26. The method of claim 8 in which the μOPs of the plurality of micro ops include an $ms_{13}$ call μOP that takes a next a μIP, pushes the next μIP on the μIP stack, and uses the next μIP in an intermediate field as a target μIP of a jump.

27. The method at claim 8 in which the μOPs of the plurality of micro ops include an ms_push μOP that takes a value in an intermediate field and pushes the value on the μIP stack.

28. The method of claim 8 in which the μOPs of the plurality of micro ops include an ms_pop μOP that pops a value off the μIP stack and replaces the value with the μOP's intermediate field.

29. The method of claim 8 in which the μOPs of the plurality of micro ops include an ms_return μOP that pops a value off of the μIP stack and jumps to that μIP.

30. The method of claim 8 in which the μOPs of the plurality of micro ops include an ms_tos_read μOP that reads a value off the μIP stack and replaces this μOP's intermediate field.

31. The method of claim 8 in which the μOPs of the plurality of micro ops include an ms_μip_stack_clear μOP that sets the μIP stack pointers to reset.

32. A computer program product residing on a computer readable medium having instructions stored thereon which, when executed by the processor, cause the processor to:
execute microcode (μcode) addressed through pointers stored in an out-of-order microinstruction pointer (μIP) stack, a plurality of the pointers associated with a common instruction that is decoded into a plurality of micro ops, the plurality of pointers placed on the out-of-order microinstruction pointer stack and removed from the microinstruction pointer stack before it is known if a sequence of microinstruction pointed to by the plurality of pointers is valid; and
manipulate the μIP stack with a set of microinstructions.

33. The computer program product of claim 32 wherein instructions to manipulate further comprise instructions to:
push a next μIP on to the μIP stack; and
use the next μIP in an intermediate field as a target μIP in a jump operation.

34. The computer program product of claim 32 wherein instructions to manipulate further comprise instructions to:
take a value of an intermediate field of a microoperation (μOp) of the plurality of micro ops; and
push the value on to the μIP stack.

35. The computer program product of claim 32 wherein instructions to manipulate further comprise instructions to:
pop a value off the μIP stack; and
replace a current μOp intermediate field with the value.

36. The computer program product of claim 32 wherein instructions to manipulate further comprise instructions to:
pop a value off of the μIP stack; and
jump to that value.

37. The computer program product of claim 32 wherein instructions to manipulate further comprise instructions to:
read a value off the μIP stack; and
replace a μOp's intermediate field with the value.

38. The computer program product of claim 32 wherein instructions to manipulate further comprise instructions to:
set the μIP stack pointers to reset.

* * * * *